United States Patent
Wang

(10) Patent No.: US 11,888,913 B2
(45) Date of Patent: Jan. 30, 2024

(54) EXTERNAL STREAM REPRESENTATION PROPERTIES

(71) Applicant: Lemon Inc., Grand Cayman (KY)

(72) Inventor: Ye-kui Wang, San Diego, CA (US)

(73) Assignee: LEMON INC.

( * ) Notice: Subject to any disclaimer, the term of this patent is extended or adjusted under 35 U.S.C. 154(b) by 0 days.

(21) Appl. No.: 17/721,049

(22) Filed: Apr. 14, 2022

(65) Prior Publication Data

US 2022/0353317 A1    Nov. 3, 2022

Related U.S. Application Data

(60) Provisional application No. 63/180,834, filed on Apr. 28, 2021.

(51) Int. Cl.
*H04L 65/65* (2022.01)
*H04L 67/02* (2022.01)
*H04N 21/84* (2011.01)
*H04N 21/435* (2011.01)

(52) U.S. Cl.
CPC .............. *H04L 65/65* (2022.05); *H04L 67/02* (2013.01); *H04N 21/435* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 9,705,955 | B2* | 7/2017 | Giladi | H04L 65/80 |
| 10,433,327 | B2* | 10/2019 | Oyman | H04W 24/02 |
| 2016/0219301 | A1* | 7/2016 | Pettersson | H04N 19/107 |
| 2020/0084428 | A1* | 3/2020 | Oh | H04N 13/194 |
| 2021/0099508 | A1* | 4/2021 | Sodagar | H04N 21/84 |
| 2022/0116442 | A1* | 4/2022 | Sodagar | H04L 65/65 |
| 2022/0217190 | A1* | 7/2022 | Sodagar | H04N 21/4524 |

FOREIGN PATENT DOCUMENTS

| | | |
|---|---|---|
| JP | 2018512771 A | 5/2018 |
| JP | 2022056418 A | 4/2022 |
| WO | 2015008775 A1 | 1/2015 |
| WO | 2018173875 A1 | 9/2018 |

OTHER PUBLICATIONS

Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, JVET-G1001-v1, 50 pages.

(Continued)

*Primary Examiner* — Lashonda Jacobs-Burton
(74) *Attorney, Agent, or Firm* — Conley Rose, P.C.

(57) ABSTRACT

A mechanism for processing video data is disclosed. An essential property (EssentialProperty) of a Dynamic Adaptive Streaming over Hypertext transfer protocol (DASH) representation is determined. The EssentialProperty indicates that the representation is an external stream representation (ESR). A conversion is performed between a visual media data and a media presentation based on the based on the ESR.

20 Claims, 7 Drawing Sheets

4200

4202 — Determine an EssentialProperty of a DASH representation or adaptation set, wherein the EssentialProperty indicates that the representation or specified representations of the adaptation is an ESR.

4204 — Performing a conversion between a visual media data and a media presentation based on the ESR.

(56) References Cited

OTHER PUBLICATIONS

Bross, B., "Versatile Video Coding (Draft 10)," Joint Video Experts Team (JVET) of ITU-T SG 16 WP 3 and ISO/IEC JTC 1/SC 29/WG 11, 19th Meeting: by teleconference, Jun. 22-Jul. 1, 2020, JVET-S2001-vH, 548 pages.

"Series H: Audiovisual and Multimedia Systems, Infrastructure of audiovisual services—Coding of moving video, Versatile supplemental enhancement information messages for coded video bitstreams," ITU-T, H.274, Aug. 2020, 86 pages.

Boyce, J., "Versatile supplemental enhancement information messages for coded video bitstreams (Draft 5)," Joint Video Experts Team (JVET) of ITU-T SG 16 WP 3 and ISO/IEC JTC 1/SC 29/WG 11, 18th Meeting: by teleconference, Apr. 15-24, 2020, JVET-S2007-v7, 85 pages.

Qualcomm Incorporated, "Editor's Version of DASH IS 4th Edition," ISO/IEC JTC1/SC29/WG11 MPEG2019/m52458, Jan. 2020, Brussels, BE, 287 pages.

WG 03, et al., "Potential improvements on Carriage of VVC and EVC in ISOBMFF," ISO/IEC JTC 1/SC 29/WG 03 N0035, Nov. 13, 2020, 66 pages.

"Revised text of ISO/IEC 23008-12:2017 CDAM 3 Support for VVC, EVC, slideshows and other improvements," ISO/IEC JTC 1/SC 29/WG 03 N0038, Oct. 26, 2020, 30 pages.

Wang, Y., et al., "AHG9: Cross Rap referencing (CRR) SEI message," Joint Video Experts Team (JVET) of ITU-T SG 16 WP 3 and ISO/IEC JTC 1/SC 29, 21st Meeting, by teleconference, Jan. 6-15, 2021, 6 pages.

"Series H: Audiovisual and Multimedia Systems, Infrastructure of audiovisual services—Coding of moving video, High Efficiency Video Coding," ITU-T H.265, Feb. 2018, 692 pages.

"Series H: Audiovisual and Multimedia Systems—Infrastructure of audiovisual services—Coding of moving video, Versatile video coding," ITU-T H.266, Aug. 2020, 516 pages.

"Information technology—Coding of audio-visual objects—Part 15:Advanced Video Coding (AVC) file format," ISO/IEC 14496-15, Second Edition Jun. 1, 2010, 96 pages.

Wang, Y-K., et al., "[DASH] External Stream Representation (ESR) for support of EDRAP based video streaming" ISO/IEC JTC 1/SC 29/WG 3 m56674, Apr. 2021, 4 pages.

Document: JVET-T0071-v1, Wang, Y.K., "AHG9: SEI messages for support of cross RAP referencing based video coding," Joint Video Experts Team (JVET) of ITU-T SG 106 WP 3 and ISO/IEC JTC 10/SC 29, 20th meeting, by teleconference, 7-16 P\Oct. 2020, 5 pages.

Y-K Wang, et al., "[ISOBMFF] External stream track (EST) for support of EDRAP based video streaming" ISO/IEC JTC 1/SC 29/WG 3 m56675, Apr. 2021, 3 pages.

Wang, Y.K., "EDRAP based video streaming" Apr. 19, 2021, 5 pages.

Foreign Communication From A Related Counterpart Application, European Application No. 22169215.5, Extended European Search Report dated Sep. 8, 2022, 10 pages.

Foreign Communication From A Related Counterpart Application, European Application No. 221069215.5, Extended European Search Report dated Sep. 8, 2022, 10 pages.

* cited by examiner

EXTERNAL STREAM REPRESENTATION PROPERTIES

CROSS-REFERENCE TO RELATED APPLICATIONS

This patent application claims the benefit of U.S. Provisional Patent Application No. 63/180,834 filed Apr. 28, 2021 by Ye-Kui Wang, and titled "Signalling Of Properties Of An External Stream Representation," which is hereby incorporated by reference.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining an essential property (EssentialProperty) of a Dynamic Adaptive Streaming over Hypertext transfer protocol (DASH) representation, wherein the EssentialProperty indicates that the representation is an external stream representation (ESR); and performing a conversion between a visual media data and a media presentation based on the ESR.

Optionally, in any of the preceding aspects, another implementation of the aspect provides that the EssentialProperty further indicates that the representation shall not be consumed or played back by itself.

Optionally, in any of the preceding aspects, another implementation of the aspect provides determining an EssentialProperty of a DASH adaptation set, wherein the EssentialProperty indicates that each representation in the adaptation set is an ESR.

Optionally, in any of the preceding aspects, another implementation of the aspect provides that the EssentialProperty includes a scheme identifier uniform resource identifier (@schemeIdUri) of "urn:mpeg:dash:adaptation-set-external-stream:202X", where X is a digit.

Optionally, in any of the preceding aspects, another implementation of the aspect provides that the EssentialProperty has a value (@value attribute) that specifies a list of identifier (@id) values of main streaming representations.

Optionally, in any of the preceding aspects, another implementation of the aspect provides determining an external stream adaptation set flag (@esasflag) attribute of a DASH adaptation set, wherein the @esasflag attribute is equal to true to specify that each representation in the adaptation set that is an ESR.

Optionally, in any of the preceding aspects, another implementation of the aspect provides that a role element is included in the adaptation set, and wherein the role element includes a value (@value) attribute equal to supplementary when the @esasflag attribute is equal to true.

Optionally, in any of the preceding aspects, another implementation of the aspect provides that the conversion includes encoding the visual media data into the media data file.

Optionally, in any of the preceding aspects, another implementation of the aspect provides that the conversion includes decoding the visual media data from the media data file.

A second aspect relates to apparatus for processing video data comprising: a processor; and a non-transitory memory with instructions thereon, wherein the instructions upon execution by the processor, cause the processor to: determine an essential property (EssentialProperty) of a Dynamic Adaptive Streaming over Hypertext transfer protocol (DASH) representation, wherein the EssentialProperty indicates that the representation is an external stream representation (ESR); and perform a conversion between a visual media data and a media presentation based on the ESR.

Optionally, in any of the preceding aspects, another implementation of the aspect provides that the EssentialProperty further indicates that the representation shall not be consumed or played back by itself.

Optionally, in any of the preceding aspects, another implementation of the aspect provides determining an EssentialProperty of a DASH adaptation set, wherein the EssentialProperty indicates that each representation in the adaptation set is an ESR.

Optionally, in any of the preceding aspects, another implementation of the aspect provides that the EssentialProperty includes a scheme identifier uniform resource identifier (@schemeIdUri) of "urn:mpeg:dash:adaptation-set-external-stream:202X", where X is a digit.

Optionally, in any of the preceding aspects, another implementation of the aspect provides that the EssentialProperty has a value (@value attribute) that specifies a list of identifier (@id) values of main streaming representations.

Optionally, in any of the preceding aspects, another implementation of the aspect provides determining an external stream adaptation set flag (@esasflag) attribute of a DASH adaptation set, wherein the @esasflag attribute is equal to true to specify that each representation in the adaptation set that is an ESR.

Optionally, in any of the preceding aspects, another implementation of the aspect provides that a role element is included in the adaptation set, and wherein the role element includes a value (@value) attribute equal to supplementary when the @esasflag attribute is equal to true.

A third aspect relates to a non-transitory computer readable medium comprising a computer program product for use by a video coding device, the computer program product comprising computer executable instructions stored on the non-transitory computer readable medium such that when executed by a processor cause the video coding device to: determine an essential property (EssentialProperty) of a Dynamic Adaptive Streaming over Hypertext transfer protocol (DASH) representation, wherein the EssentialProperty indicates that the representation is an external stream representation (ESR); and perform a conversion between a visual media data and a media presentation based on the ESR.

Optionally, in any of the preceding aspects, another implementation of the aspect provides that the EssentialProperty further indicates that the representation shall not be consumed or played back by itself.

Optionally, in any of the preceding aspects, another implementation of the aspect provides determining an EssentialProperty of a DASH adaptation set, wherein the EssentialProperty indicates that each representation in the adaptation set is an ESR.

Optionally, in any of the preceding aspects, another implementation of the aspect provides that the EssentialProperty includes a scheme identifier uniform resource identifier (@schemeIdUri) of "urn:mpeg:dash:adaptation-set-external-stream:202X", where X is a digit.

Optionally, in any of the preceding aspects, another implementation of the aspect provides that the EssentialProperty has a value (@value attribute) that specifies a list of identifier (@id) values of main streaming representations.

Optionally, in any of the preceding aspects, another implementation of the aspect provides determining an external stream adaptation set flag (@esasflag) attribute of a DASH adaptation set, wherein the @esasflag attribute is equal to true to specify that each representation in the adaptation set that is an ESR.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
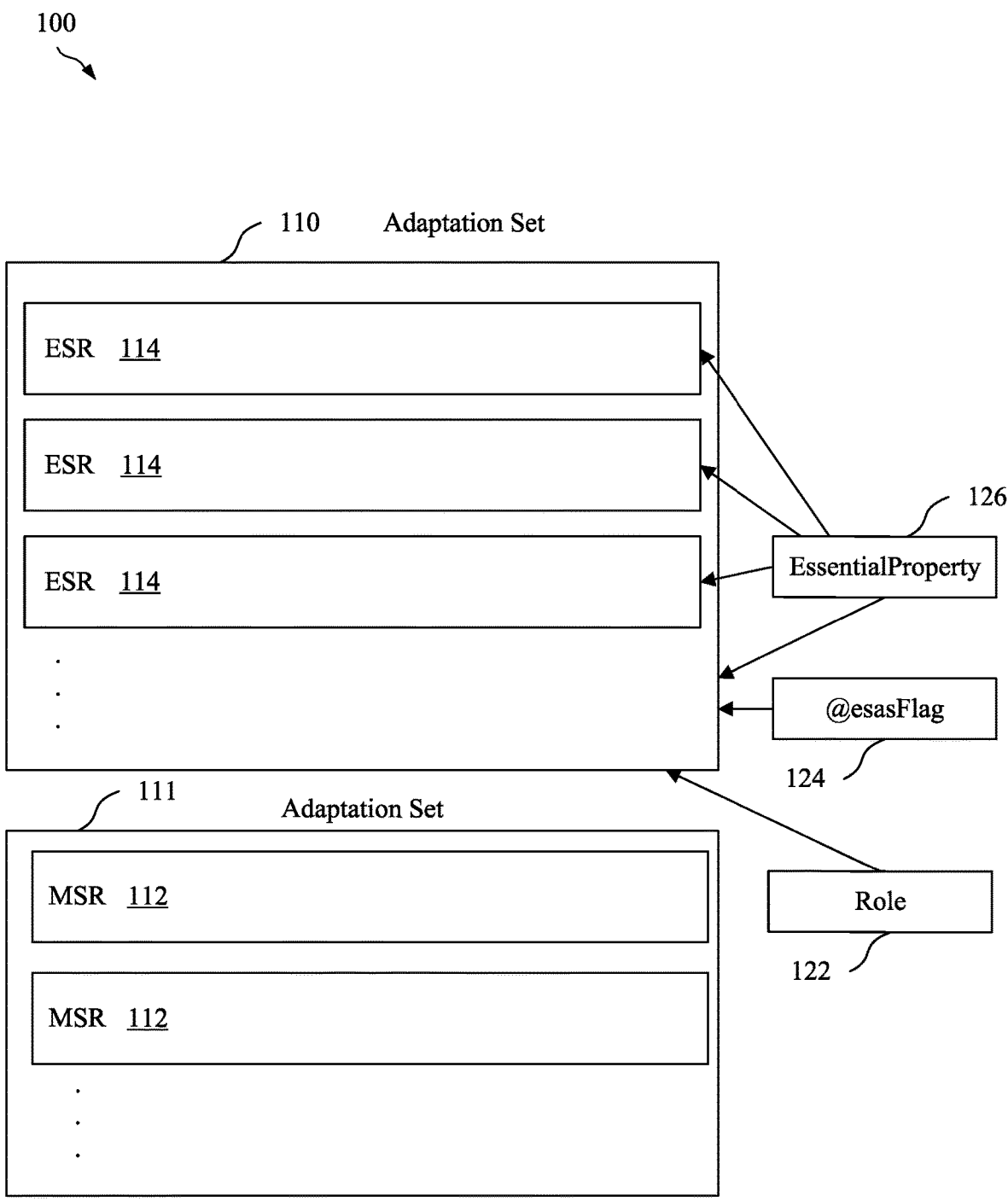
FIG. 1 is a schematic diagram illustrating an example Dynamic Adaptive Streaming over Hypertext transfer protocol (DASH) media file.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This patent document is related to a video streaming. Specifically, this document is related to the signaling of properties of an external stream representation. Such properties may be needed for random accessing from segments starting at an extended dependent random access point (EDRAP) picture in a main stream representation. The ideas described herein may be applied individually or in various combinations, for media streaming systems, such systems based on the Dynamic Adaptive Streaming over Hypertext transfer protocol (DASH) standard and related extensions.

Video coding standards have evolved primarily through the development of the International Telecommunication Union (ITU) Telecommunications Standardization Sector (ITU-T) and ISO/International Electrotechnical Commission (IEC) standards. The ITU-T produced H.261 and H.263, ISO/IEC produced Motion Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET was later renamed to be the Joint Video Experts Team (JVET) when the Versatile Video Coding (VVC) project officially started. VVC is a coding standard targeting a 50% bitrate reduction as compared to HEVC. VVC has been finalized by the JVET.

The VVC standard, also known as ITU-T H.2661 ISO/IEC 23090-3, and the associated Versatile Supplemental Enhancement Information (VSEI) standard, also known as ITU-T H.274|ISO/IEC 23002-7, are designed for use in a broad range of applications, such as television broadcast, video conferencing, playback from storage media, adaptive bit rate streaming, video region extraction, composition and merging of content from multiple coded video bitstreams, multiview video, scalable layered coding, and viewport-adaptive three hundred sixty degree (360°) immersive media. The Essential Video Coding (EVC) standard (ISO/IEC 23094-1) is another video coding standard developed by MPEG.

File format standards are discussed below. Media streaming applications are typically based on the Internet Protocol (IP), Transmission Control Protocol (TCP), and Hypertext Transfer Protocol (HTTP) transport methods, and typically rely on a file format such as the ISOBMFF. One such streaming system is dynamic adaptive streaming over HTTP (DASH). Video can be encoded in a video format, such as AVC and/or HEVC. The encoded video can be encapsulated in ISOBMFF tracks and included in DASH representations and segments. Important information about the video bitstreams, such as the profile, tier, and level, and many others, may be exposed as file format level metadata and/or in a DASH media presentation description (MPD) for content selection purposes. For example, such information can be used for selection of appropriate media segments both for initialization at the beginning of a streaming session and for stream adaptation during the streaming session.

Similarly, when using an image format with base International Organization for Standardization (ISO) media file format (ISOBMFF), a file format specification specific to the image format, such as the AVC image file format and the HEVC image file format, may be employed. The VVC video file format, the file format for storage of VVC video content based on ISOBMFF, is under development by MPEG. The VVC image file format, the file format for storage of image content coded using VVC, based on ISOBMFF, is also under development by MPEG.

DASH is now discussed. In DASH, there may be multiple representations for video and/or audio data of multimedia content. Different representations may correspond to different coding characteristics, such as different profiles or levels of a video coding standard, different bitrates, different spatial resolutions, etc. The manifest of such representations may be defined in a Media Presentation Description (MPD) data structure. A media presentation may correspond to a structured collection of data that is accessible to a DASH streaming client device. The DASH streaming client device may request and download media data information to present a streaming service to a user of the client device. A media presentation may be described in the MPD data structure, which may include updates of the MPD.

A media presentation may contain a sequence of one or more periods. Each period may extend until the start of the next period or until the end of the media presentation in the case of the last period. Each period may contain one or more representations for the same media content. A representation may be one of a number of alternative encoded versions of audio, video, timed text, or other such data. The representations may differ by encoding types, for example by bitrate, resolution, codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other. Accordingly, a client device can dynamically and seamlessly switch between these representations, for example to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. For example, the client device may select an adaptation set including video representations, an adaptation set including audio representations, and/or an adaptation set including timed text. In an example, the client device may select adaptation sets for certain types of media such as video, and directly select representations for other types of media such as audio and/or timed text.

An example DASH streaming procedure can be shown by the following steps. The client obtains the MPD. The client then estimates the downlink bandwidth, and selects a video representation and an audio representation according to the estimated downlink bandwidth, the codec, the decoding capability, the display size, the audio language setting, etc. Until the end of the media presentation is reached, the client requests media segments of the selected representations and presents the streaming content to the user. The client keeps estimating the downlink bandwidth. When the bandwidth changes significantly, for example by becoming lower or becoming higher, the client selects a different video representation to match the newly estimated bandwidth, continues to download segments at the updated downlink bandwidth.

EDRAP pictures are now discussed based video coding and streaming. Signaling of EDRAP pictures using a supplemental enhancement information (SEI) message is adopted into the VSEI specification. An external stream track (EST) design for the ISOBMFF and/or an external stream representation (ESR) design for DASH may be used support EDRAP based video streaming. An ESR design operates as described below.

In an example design, definitions for ESR are as follows. An external elementary stream is an elementary stream containing access units with external pictures. An external picture is a picture that is in the external elementary stream in an ESR and is needed for inter prediction reference in decoding of the elementary stream in the MSR when random accessing from certain EDRAP pictures in the MSR. An ESR is a representation containing an external elementary stream. A Main Stream Representation (MSR) is a representation containing a video elementary stream. Random access is decoding of an elementary stream starting from a particular picture without decoding of any picture in the elementary stream earlier in decoding order An example of semantics of an AdaptationSet element is described as follows.

| Element or Attribute Name | Use | Description |
| --- | --- | --- |
| AdaptationSet ... | | Adaptation Set description |
| @subsegmentStartsWithSAP | OD default: 0 | when greater than 0, specifies that each Subsegment with SAP_type greater than 0 starts with a SAP of type less than or equal to the value of @subsegmentStartsWithSAP. A Subsegment starts with SAP when the Subsegment contains a SAP, and for the first SAP, $I_{SAU}$ is the index of the first access |

-continued

| Element or Attribute Name | Use | Description |
|---|---|---|
| | | unit that follows $I_{SAP}$, and $I_{SAP}$ is contained in the Subsegment.<br>The semantics of @subsegmentStartsWithSAP equal to 0 are unspecified. |
| @esasFlag | OD default: false | when not set to 'false', this specifies that all Representations in the Adaptation Set are Main Stream Representations (MSRs). The value set to 'true' specifies that all Representations in the Adaptation Sets are External Stream Representations (ESRs).<br>When not present, the value of this attribute is inferred to be equal to 'false'.<br>When the value of this attribute is equal to 'true' for an Adaptation Set (i.e., all Representations in this Adaptation Set are ESRs), each Representation in this Adaptation Set shall be associated with an MSR through the Representation attributes @associationId and @associationType in the MSR, i.e., the @id of each Representation in this Adaptation Set shall be referred to by a value contained in the attribute @associationId corresponding to a value in the attribute @associationType equal to 'aest', where @associationId and @associationType are Representation attributes of an MSR.<br>When the value of this attribute is equal to 'false' for an Adaptation Set (i.e., all Representations in this Adaptation Set are MSRs), each EDRAP picture in any Representation in this Adaptation Set shall be the first picture in a Segment.<br>For an MSR and an ESR associated with each other through the Representation attributes @associationId and @associationType in the MSR, the following constraints apply:<br>For each Segment in the MSR that starts with an EDRAP picture, there shall be a Segment in the ESR having the same Segment start time derived from the MPD as the Segment in the MSR, wherein the Segment in the ESR carries the external pictures needed for decoding of that EDRAP picture and the subsequent pictures in decoding order in the bitstream carried in the MSR.<br>For each Segment in the MSR that does not start with an EDRAP picture, there shall be no Segment in the ESR having the same Segment start time derived from the MPD as the Segment in the MSR. |
| . . . | | |

An example extensible markup language (XML) syntax is described below.

```
<!-- Adaptation Set -->
<xs:complexType name="AdaptationSetType">
    <xs:complexContent>
        <xs:extension base="RepresentationBaseType">
            <xs:sequence>
                <xs:element name="Accessibility" type="DescriptorType" minOccurs="0" maxOccurs="unbounded"/>
                <xs:element name="Role" type="DescriptorType" minOccurs="0" maxOccurs="unbounded"/>
                <xs:element name="Rating" type="DescriptorType" minOccurs="0" maxOccurs="unbounded"/>
                <xs:element name="Viewpoint" type="DescriptorType" minOccurs="0" maxOccurs="unbounded"/>
                <xs:element name="ContentComponent" type="ContentComponentType" minOccurs="0" maxOccurs="unbounded"/>
                <xs:element name="BaseURL" type="BaseURLType" minOccurs="0" maxOccurs="unbounded"/>
                <xs:element name="SegmentBase" type="SegmentBaseType" minOccurs="0"/>
                <xs:element name="SegmentList" type="SegmentListType"
```

```
minOccurs="0"/>
            <xs: element name="SegmentTemplate"
type="SegmentTemplateType" minOccurs="0"/>
            <xs:element name="Representation" type="RepresentationType"
minOccurs="0" maxOccurs="unbounded"/>
        </xs:sequence>
        <xs:attribute ref="xlink:href"/>
        <xs:attribute ref="xlink:actuate" default="onRequest"/>
        <xs:attribute name="id" type="xs:unsignedInt"/>
        <xs:attribute name="group" type="xs:unsignedInt"/>
        <xs:attribute name="lang" type="xs:language"/>
        <xs:attribute name="contentType" type="IETF
RFC6838ContentTypeType"/>
        <xs:attribute name="par" type="RatioType"/>
        <xs:attribute name="minBandwidth" type="xs:unsignedInt"/>
        <xs:attribute name="maxBandwidth" type="xs:unsignedInt"/>
        <xs:attribute name="minWidth" type="xs:unsignedInt"/>
        <xs:attribute name="maxWidth" type="xs:unsignedInt"/>
        <xs:attribute name="minHeight" type="xs:unsignedInt"/>
        <xs:attribute name="maxHeight" type="xs:unsignedInt"/>
        <xs:attribute name="minFrameRate" type="FrameRateType"/>
        <xs:attribute name="maxFrameRate" type="FrameRateType"/>
        <xs:attribute name="segmentAlignment" type="xs:boolean"
default="false"/>
        <xs:attribute name="subsegmentAlignment" type="xs:boolean"
default="false"/>
        <xs:attribute name="subsegmentStartsWithSAP" type="SAPType"
default="0"/>
        <xs:attribute name="bitstreamSwitching" type="xs:boolean"/>
        <xs:attribute name="esasFlag" type="xs:boolean" default="false"/>
    </xs:extension>
 </xs:complexContent>
</xs:complexType>
<!-- Ratio Type for sar and par -->
<xs:simpleType name="RatioType">
    <xs:restriction base="xs:string">
        <xs:pattern value="[0-9]*:[0-9]*"/>
    </xs:restriction>
</xs:simpleType>
<!-- Type for Frame Rate -->
<xs:simpleType name="FrameRateType">
    <xs:restriction base="xs:string">
        <xs:pattern value="[0-9]*[0-9](/[0-9]*[0-9])?"/>
    </xs:restriction>
</xs:simpleType>
<!-- Type for IETF RFC6838 Content Type -->
<xs:simpleType name="IETF RFC6838ContentTypeType">
  <xs:restriction base="xs:string">
    <xs:enumeration value="text" />
    <xs:enumeration value="image" />
    <xs:enumeration value="audio" />
    <xs:enumeration value="video" />
    <xs:enumeration value="application" />
    <xs:enumeration value="font" />
  </xs:restriction>
</simpleType>
```

The following are example technical problems solved by disclosed technical solutions. Some ESR designs only support random accessing from an EDRAP picture in a main streaming representation (MSR) associated with the ESR. The ESR should not be consumed by a client or player without the MSR. However, legacy DASH clients and/or player may not recognize the attribute external stream adaptation set flag (@esasFlag), may ignore the corresponding attribute, and may select an ESR for playback which results in an error.

Disclosed herein are mechanisms to address one or more of the problems listed above. As noted above, an ESR should be decoded and played in conjunction with an MSR. However, certain devices may not recognize that a representation is an ESR, may try to decode the ESR without the MSR, and may experience an error. The present disclosure includes various mechanisms to alert legacy devices to the presence of an ESR. For example, the ESR may contain an essential property (EssentialProperty) that indicates that the representation is an ESR and should not be consumed along. In an example, the adaptation set containing the ESR may contain an EssentialProperty that indicates each ESR in the adaptation set. In an example, the ESR is indicated by a scheme identifier uniform resource identifier (@schemeIdUri) in the EssentialProperty. The @schemeIdUri may be set to "urn:mpeg:dash:adaptation-set-external-stream:202X" to indicate each ESR, where X is a digit, such as '1', '2', '3', etc. In an example, the EssentialProperty may also contain a value (@value attribute) that specifies a list of identifier (@id) values of the MSR(s) in the adaptation set. In another example, the @esasflag attribute in the adaptation set can be set equal to true to specify that each representation in the adaptation set that is an ESR. In a further example, a role element can be included in the adaptation set. Further, the role element may includes a value (@value) attribute equal to supplementary when the @esasflag attribute is equal to true.

FIG. 1 is a schematic diagram illustrating an example DASH media file 100. The DASH media file 100 may be described by a manifest, such as a media presentation description (MPD). The client and/or decoder can obtain the MPD from the encoder and/or from an intermediate server. The client can then request content from the DASH media file 100 based on the syntax elements in the MPD.

The media file 100 includes one or more adaptation sets 110 and 111. An adaptation set 110 and/or 111 is a set of interchangeable representations. A representation includes a version of the media content. When applied to video, each representation may include the same video content in different resolutions, frame rates, etc. Accordingly, a client can dynamically request different representations depending on changes in available network bandwidth. Different adaptation sets 110 may include different media types, such as video, audio, and close captioning. Further, different adaptation sets 110 may contain video coded at different picture sizes, and hence sized for different client screens. As such, an adaptation set 110 and/or 111 is a set of representations that can be used interchangeably by the client, and a representation is a version of media content.

In the present example, the representations include one or more MSRs 112 and one or more ESRs 114. A MSR 112 is a representation that contains a video elementary stream. A video elementary stream is a complete set of video content. An ESR 114 is a representation containing an external elementary stream, which is a stream that contains extended dependent random access point (EDRAP) pictures. An EDRAP picture is a picture that can be used for random access, which supports starting a video at a user selected location other than the first picture in the stream. Accordingly, in the configuration illustrated, the client performs random access by obtaining a segment from an ESR 114 in adaptation set 110 and a segment from a corresponding MSR 112 in adaptation set 111. The client can then use the EDRAP picture from the ESR 114 to begin decoding the segment from the MSR 112 for display to the user. The ESR 114 functionality may not be supported by legacy clients. For example, a legacy client may request and decode the ESR 114 segment from a first adaptation set 110 without obtaining the MSR 112 segment from a second adaptation set 111. This results in the legacy client decoding and displaying a single picture from the ESR 114 instead of the intended video stream.

The present disclosure addresses this issue by including signaling to indicate to a legacy client that the ESR 114 cannot be decoded without also decoding a corresponding MSR 112. In an example, this can be indicated by an essential property (EssentialProperty) 126. The EssentialProperty 126 is syntax included in the MPD. In one example, the EssentialProperty 126 is included in syntax describing each ESR 114 to indicate that the corresponding ESR 114 cannot be decoded without also referencing another representation. In another example, the EssentialProperty 126 can be included in the syntax associated with the adaptation set 110. In this example, the EssentialProperty 126 indicates that each of the representations in the adaptation set 110 is an ESR 114 and, therefore none of the representations in the adaptation set 110 can be decoded without also referencing another representation. In an example, the EssentialProperty 126 may contain a scheme identifier uniform resource identifier (@schemeIdUri) set to "urn:mpeg:dash:adaptation-set-external-stream:202X", where X is a digit, such as '1', '2', '3', etc. This may indicate adaptation set 110 includes external streams in ESRs 114. In an example, the @schemeIdUri in the EssentialProperty 126 may also contain a value (@value attribute) that specifies a list of identifier (@id) values of the MSRs 112 corresponding to the ESRs 114.

In another example, an external stream adaptation set flag (@esasflag) attribute 124 is included in the syntax associated with the adaptation set 110. The @esasflag attribute 124 can be set to true to specify each representation in the adaptation set 110 is an ESR 114, and hence cannot be decoded without also referencing another representation. In another example, a role element 122 can be included in the syntax for the adaptation set 110. The role element 122 can include a value (@value) attribute equal to supplementary when the @esasflag attribute is equal to true. This indicates that adaptation set 110 is a supplemental adaptation set 110, and hence contains ESRs 114.

To solve the above problems, and others, methods as summarized below are disclosed. The items should be considered as examples to explain the general concepts and should not be interpreted in a narrow way. Furthermore, these items can be applied individually or combined in any manner.

Example 1

In one example, an essential property (EssentialProperty) with a scheme identifier URI (@schemeIdUri) of "urn:mpeg:dash:adaptation-set-external-stream:202X" is specified, where X is a digit, such as '1', '2', '3', etc. The presence of this EssentialProperty in a Representation indicates that the Representation is an ESR and shall not be consumed or played back by itself. Further, the presence of this EssentialProperty in an Adaptation Set indicates that each Representation in the Adaptation Set is an ESR and shall not be consumed or played back by itself.

Example 2

In one example, the EssentialProperty. with a @schemeIdUri of "urn:mpeg:dash:adaptation-set-external-stream: 202X", where X is a digit, such as '1', '2', '3', etc., is further specified to have a value (@value) attribute specifying the list of identifier (@id) values of the Main Streaming Representations associated with the Representations in the Adaptation Set containing the EssentialProperty. The i-th @id value in the @value attribute corresponds to the i-th Representation in the Adaptation Set containing the EssentialProperty.

Example 3

In another example, a rule specifies that the value of the @esasFlag attribute is equal to true to specify that each Representation in the Adaptation Set is an ESR and shall not be consumed or played back by itself.

Example 4

In another example, a rule may require that a Role element with the @value attribute equal to supplementary is present for each Adaptation Set that has the @esasFlag attribute equal to true.

Figure 2:
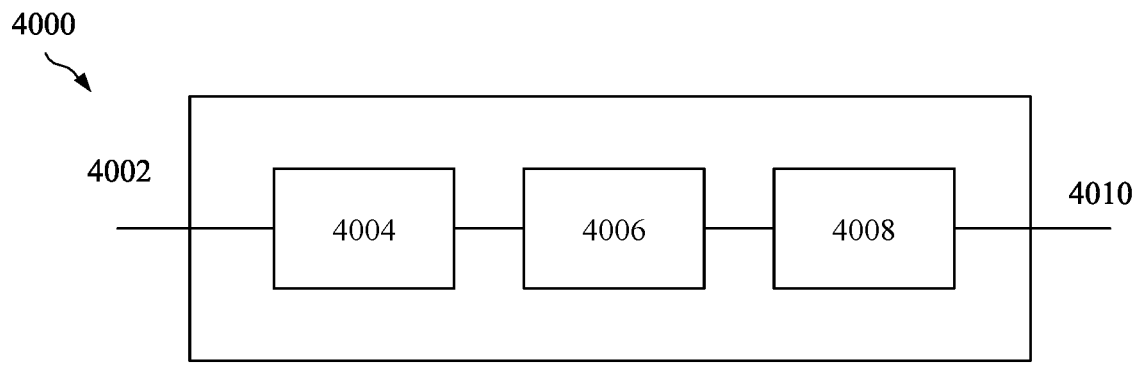
FIG. 2 is a block diagram showing an example video processing system.

FIG. 2 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 3:
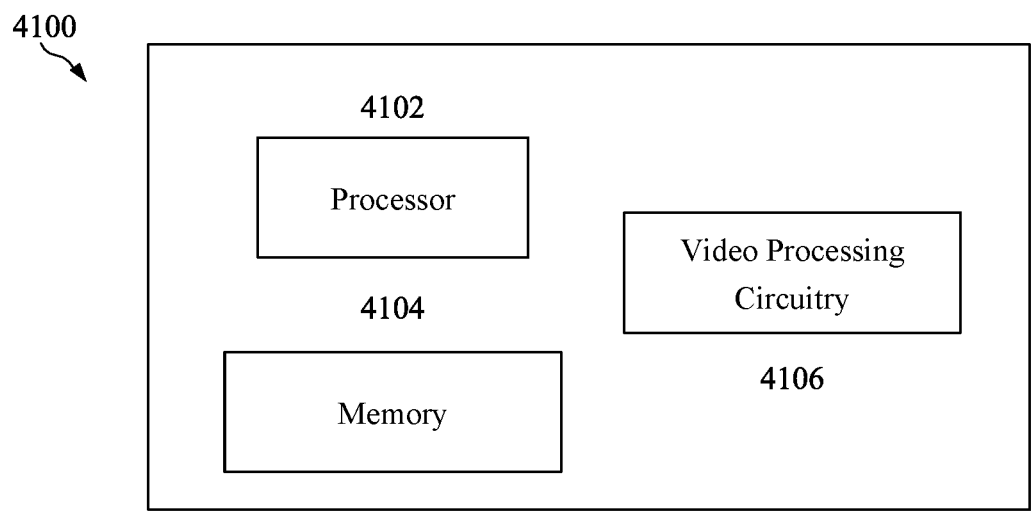
FIG. 3 is a block diagram of an example video processing apparatus.

FIG. 3 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present document. The memory (memories) 4104 may be used for storing data and code used for implementing the methods and techniques described herein. The video processing circuitry 4106 may be used to implement, in hardware circuitry, some techniques described in the present document. In some embodiments, the video processing circuitry 4106 may be at least partly included in the processor 4102, e.g., a graphics co-processor.

Figure 4:
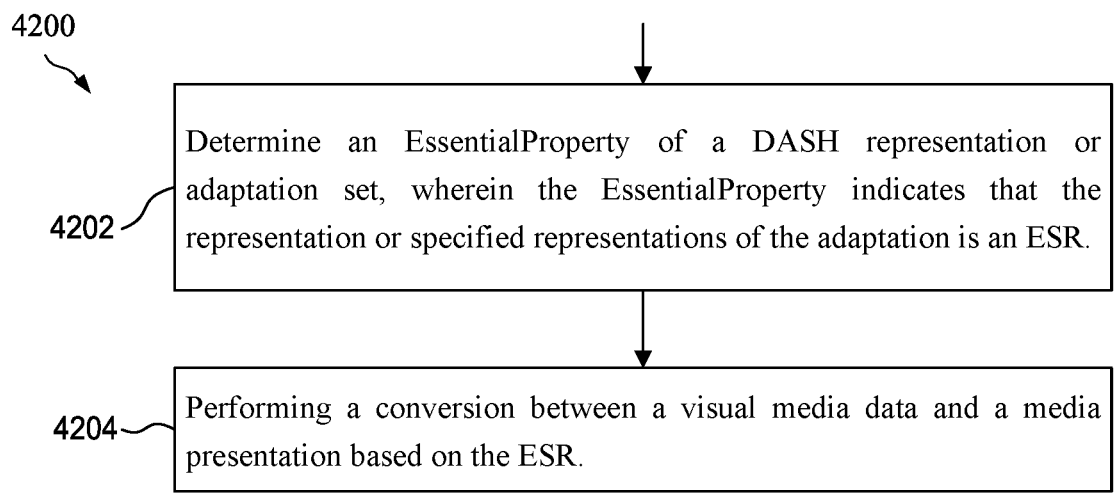
FIG. 4 is a flowchart for an example method of video processing.

FIG. 4 is a flowchart for an example method 4200 of video processing. The method 4200 includes determining an EssentialProperty of a Dynamic Adaptive Streaming over Hypertext transfer protocol (DASH) representation at step 4202. In an example, the EssentialProperty indicates that the representation is an ESR. Accordingly, the EssentialProperty further indicates that the representation shall not be consumed or played back by itself, and should instead be consumed and/or played back in conjunction with an MSR. In another example, an EssentialProperty of a DASH adaptation set may also be determined. The EssentialProperty in the adaptation set may indicate each representation in the adaptation set that is an ESR. The EssentialProperty may included in the adaptation set, in each ESR, or in both. In an example, the EssentialProperty includes a @schemeIdUri set to "urn:mpeg:dash:adaptation-set-external-stream: 202X", where X is a digit, such as '1', '2', '3', etc., which indicates the presence of one or more ESRs. In an example, the EssentialProperty has @value attribute that specifies a @id values of corresponding MSR(s). In another example, an @esasflag attribute of a DASH adaptation set may also be determined. In this example, the @esasflag attribute is equal to true to specify that each representation in the adaptation set that is an ESR. In an example, a role element is included in the adaptation set. The role element includes a @value attribute equal to supplementary when the @esasflag attribute is equal to true.

At step 4204, a conversion is performed between a visual media data and a media presentation based on the ESR. When the method 4200 is performed on an encoder, the conversion comprises generating the media presentation from the visual media data. The conversion includes determining the presence of both MSR(s) and ESR(s), and coding syntax elements to indicate that the ESR should be consumed in conjunction with one or more MSRs. When the method 4200 is performed on a decoder, the conversion comprises parsing and decoding an adaptation set and/or representations, determining the presence of an ESR, and decoding the ESR in conjunction with a corresponding MSR to obtain the visual media data.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 5:
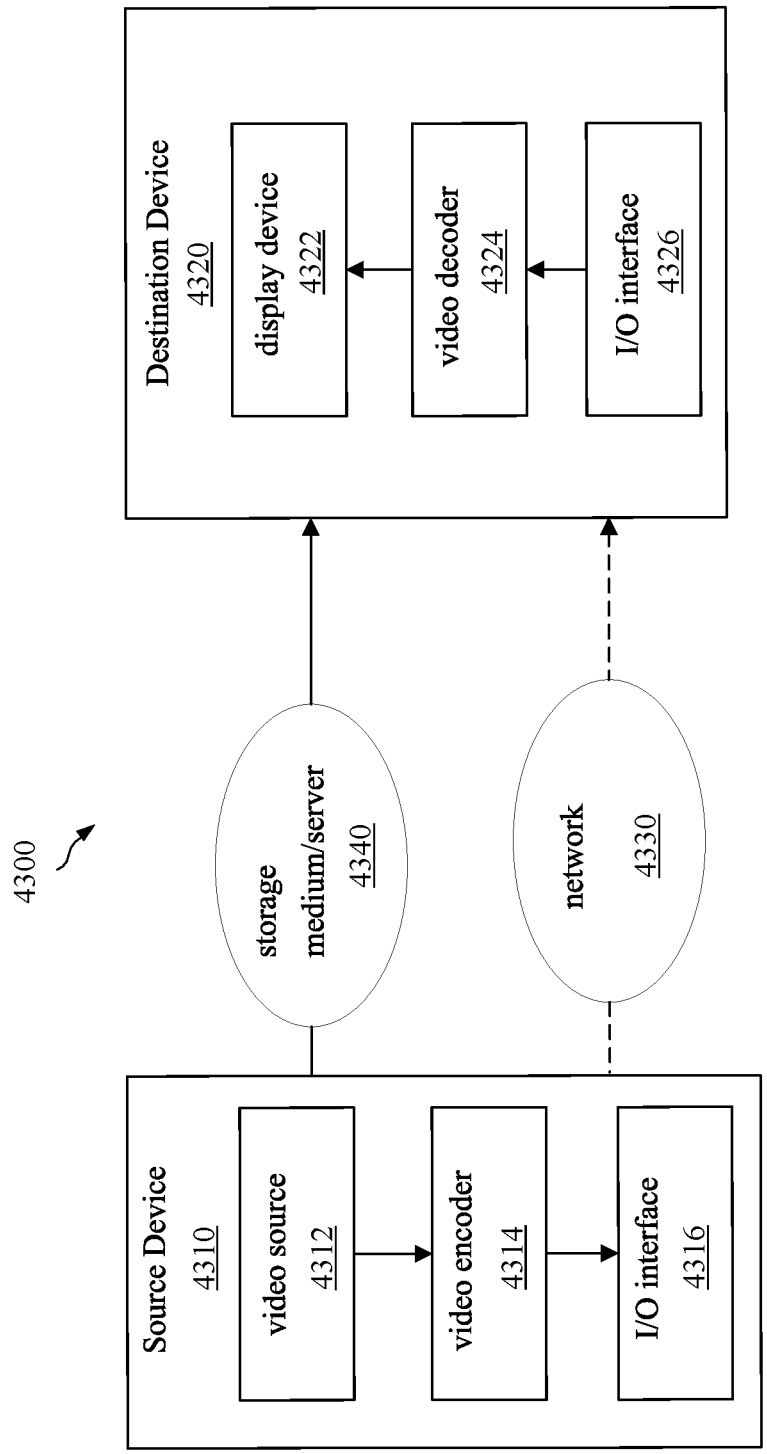
FIG. 5 is a block diagram that illustrates an example video coding system.

FIG. 5 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVM) standard and other current and/or further standards.

Figure 6:
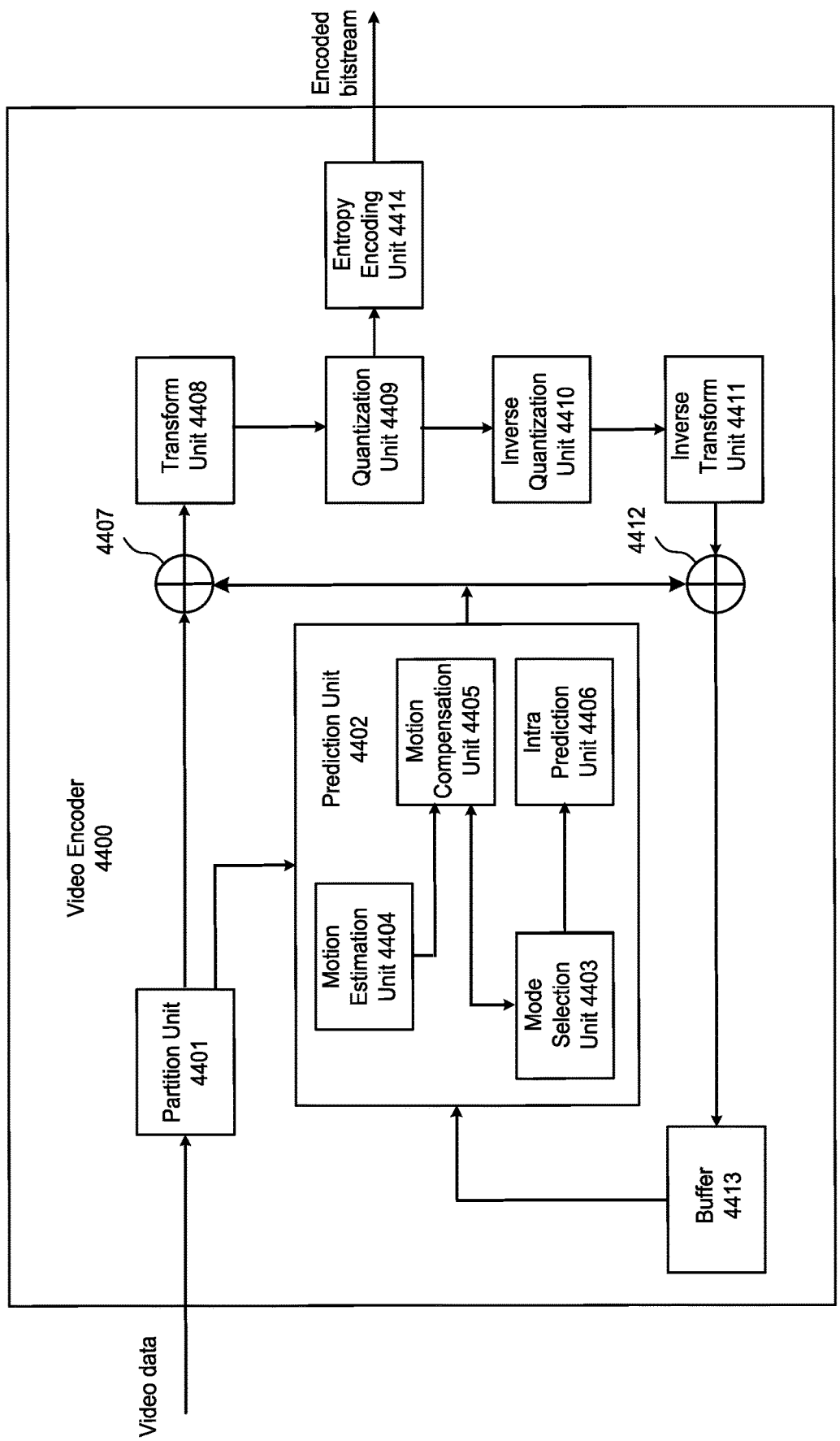
FIG. 6 is a block diagram that illustrates an example encoder.

FIG. 6 is a block diagram illustrating an example of video encoder 4400, which may be video encoder 4314 in the system 4300 illustrated in FIG. 5. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 7:
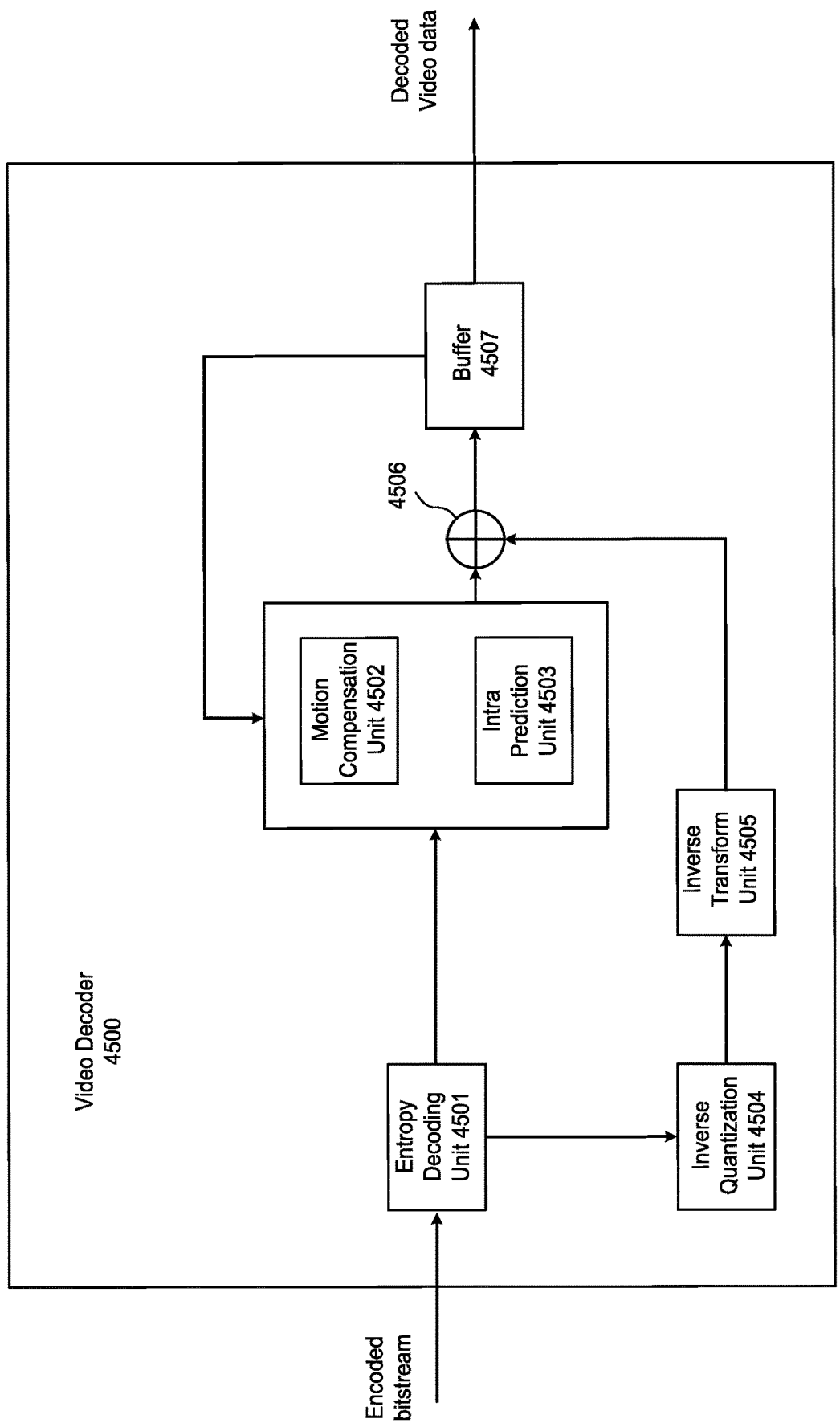
FIG. 7 is a block diagram that illustrates an example decoder.

FIG. 7 is a block diagram illustrating an example of video decoder 4500 which may be video decoder 4324 in the system 4300 illustrated in FIG. 5. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 8:
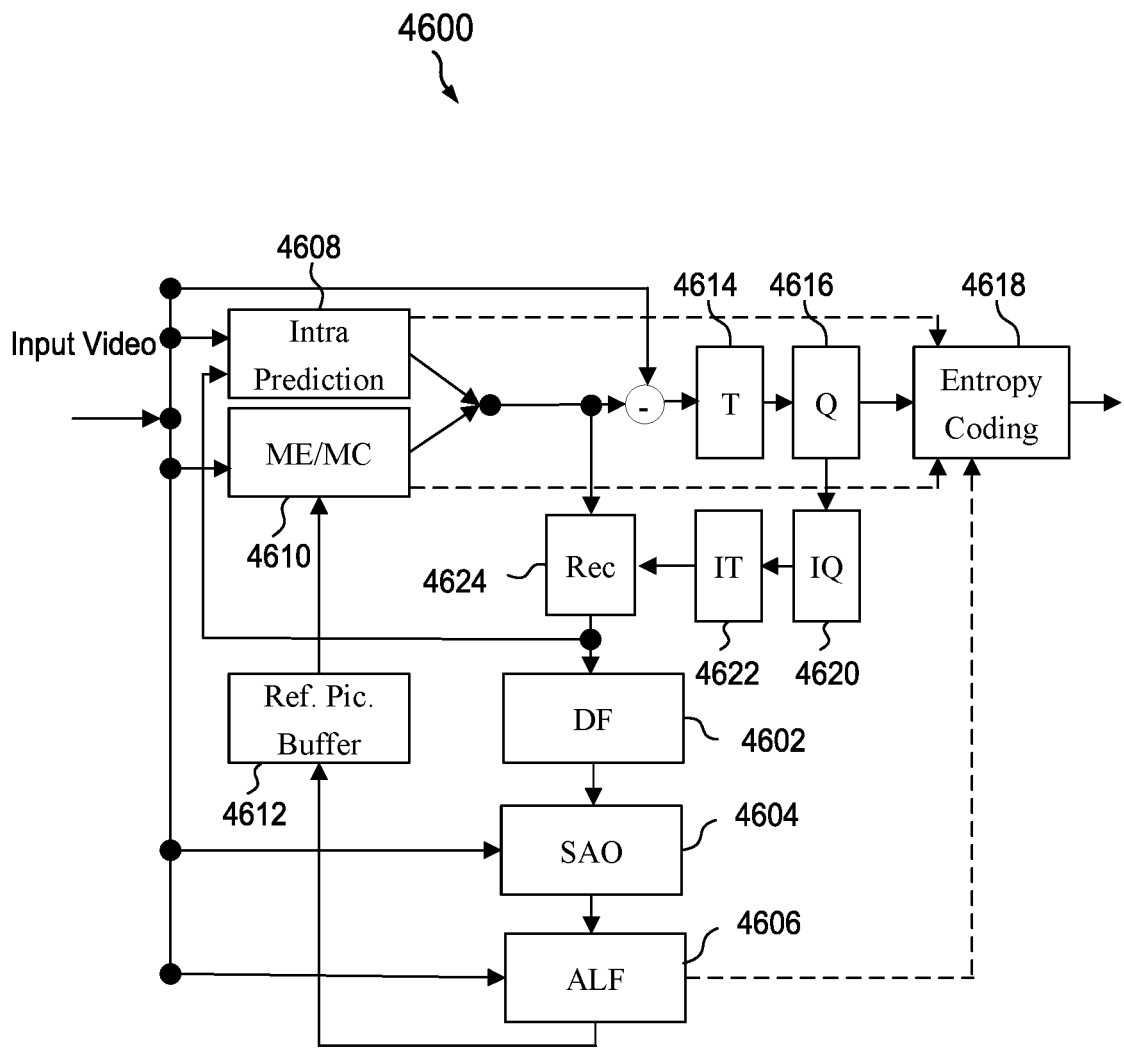
FIG. 8 is a schematic diagram of an example encoder.

FIG. 8 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

1. A method of media data processing (e.g., method 4200 depicted in FIG. 4), comprising: performing a conversion between a visual media information and a digital representation of the visual media information according to a rule, wherein the digital representation includes, for a stream of visual media information in the digital representation, a syntax element of a predetermined type, wherein the rule specifies that, responsive to a stream of the visual media information not being consumed or play back by itself, a syntax element is included in the digital representation to have a prespecified value.

2. The method of solution 1, wherein the syntax element comprises an essential type syntax element of a predetermined type.

3. The method of solutions 1-2, wherein the syntax element is included in an adaptation set associated with the stream of visual media information.

4. The method of any of solutions 1-3, wherein the rule specifies that a list is included in the digital representation, wherein an i-th entry in the list is indicative of an i-th representation of the visual media information.

5. The method of solution 1, wherein the syntax element is a flag and wherein the rule specifies that the prespecified value is a logical true responsive to the stream of the visual media information not being consumed or played back by itself.

6. The method of solution 1, wherein the syntax element is indicative or a role of the stream of visual media information, wherein the rule specifies to set the syntax element to indicate that the stream of visual media information is of a supplementary type, responsive to the stream of the visual media information not being consumed or played back by itself.

7. A method of media data processing, comprising: obtaining a digital representation of the visual media information, wherein the digital representation is generated according to a method described in any of solutions 1-6; and streaming the digital representation.

8. A method of media data processing, comprising: receiving a digital representation of the visual media information, wherein the digital representation is generated according to a method described in any of solutions 1-6; and generating the visual media information from the digital representation.

9. The method of any of solutions 1-8, wherein the conversion comprises generating a bitstream representation of the visual media data and storing the bitstream representation to the file according to the format rule.

10. The method of any of solutions 1-8, wherein the conversion comprises parsing the file according to the format rule to recover the visual media data.

11. A video decoding apparatus comprising a processor configured to implement a method recited in one or more of solutions 1 to 10.

12. A video encoding apparatus comprising a processor configured to implement a method recited in one or more of solutions 1 to 10.

13. A computer program product having computer code stored thereon, the code, when executed by a processor, causes the processor to implement a method recited in any of solutions 1 to 10.

14. A computer readable medium on which a bitstream representation complying to a file format that is generated according to any of solutions 1 to 10.

15. A method, apparatus or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:
    determining an essential property (EssentialProperty) of a Dynamic Adaptive Streaming over Hypertext transfer protocol (DASH) representation, wherein the EssentialProperty indicates that the representation is an external stream representation (ESR); and
    performing a conversion between a visual media data and a media presentation based on the ESR.

2. The method of claim 1, wherein the EssentialProperty further indicates that the representation shall not be consumed or played back by itself.

3. The method of claim 1, further comprising determining an EssentialProperty of a DASH adaptation set, wherein the EssentialProperty indicates that each representation in the adaptation set is an ESR.

4. The method of claim 1, wherein the EssentialProperty includes a scheme identifier uniform resource identifier (@schemeIdUri) of "urn:mpeg:dash:adaptation-set-external-stream:202X", where X is a digit.

5. The method of claim 3, wherein the EssentialProperty has a value (@value attribute) that specifies a list of identifier (@id) values of main streaming representations.

6. The method of claim 1, further comprising determining an external stream adaptation set flag (@esasflag) attribute of a DASH adaptation set, wherein the @esasflag attribute is equal to true to specify that each representation in the adaptation set that is an ESR.

7. The method of claim 6, wherein a role element is included in the adaptation set, and wherein the role element includes a value (@value) attribute equal to supplementary when the @esasflag attribute is equal to true.

8. The method of claim 1, wherein the conversion includes encoding the visual media data into the media data file.

9. The method of claim 1, wherein the conversion includes decoding the visual media data from the media data file.

10. An apparatus for processing video data comprising:
    a processor; and
    a non-transitory memory with instructions thereon, wherein the instructions upon execution by the processor, cause the processor to:
        determine an essential property (EssentialProperty) of a Dynamic Adaptive Streaming over Hypertext transfer protocol (DASH) representation, wherein the EssentialProperty indicates that the representation is an external stream representation (ESR); and
        perform a conversion between a visual media data and a media presentation based on the ESR.

11. The apparatus of claim 10, wherein the EssentialProperty further indicates that the representation shall not be consumed or played back by itself.

12. The apparatus of claim 10, further comprising determining an EssentialProperty of a DASH adaptation set, wherein the EssentialProperty indicates that each representation in the adaptation set is an ESR.

13. The apparatus of claim 10, wherein the EssentialProperty includes a scheme identifier uniform resource identifier (@schemeIdUri) of "urn:mpeg:dash:adaptation-set-external-stream:202X", where X is a digit.

14. The apparatus of claim 13, wherein the EssentialProperty has a value (@value attribute) that specifies a list of identifier (@id) values of main streaming representations.

15. The apparatus of claim 10, further comprising determining an external stream adaptation set flag (@esasflag) attribute of a DASH adaptation set, wherein the @esasflag attribute is equal to true to specify that each representation in the adaptation set that is an ESR.

16. The apparatus of claim 15, wherein a role element is included in the adaptation set, and wherein the role element includes a value (@value) attribute equal to supplementary when the @esasflag attribute is equal to true.

17. A non-transitory computer readable medium comprising a computer program product for use by a video coding device, the computer program product comprising computer executable instructions stored on the non-transitory computer readable medium such that when executed by a processor cause the video coding device to:
    determine an essential property (EssentialProperty) of a Dynamic Adaptive Streaming over Hypertext transfer protocol (DASH) representation, wherein the EssentialProperty indicates that the representation is an external stream representation (ESR); and
    perform a conversion between a visual media data and a media presentation based on the ESR.

18. The non-transitory computer readable medium of claim 17, wherein the EssentialProperty further indicates that the representation shall not be consumed or played back by itself.

19. The non-transitory computer readable medium of claim 17, further comprising determining an EssentialProperty of a DASH adaptation set, wherein the EssentialProperty indicates that each representation in the adaptation set is an ESR.

20. The non-transitory computer readable medium of claim 17, wherein the EssentialProperty includes a scheme identifier uniform resource identifier (@schemeIdUri) of "urn:mpeg:dash:adaptation-set-external-stream:202X", where X is a digit.

* * * * *